United States Patent [19]
Eilrich et al.

[11] B 3,920,688
[45] Nov. 18, 1975

[54] 2-IMINO DERIVATIVES OF SUBSTITUTED IMIDAZOLES

[75] Inventors: Gary L. Eilrich, Creve Coeur; William D. Dixon, Kirkwood, both of Mo.

[73] Assignee: Monsanto Company, St. Louis, Mo.

[22] Filed: Feb. 5, 1973

[21] Appl. No.: 329,787

[44] Published under the Trial Voluntary Protest Program on January 28, 1975 as document no. B 329,787.

[52] U.S. Cl. .................................. 260/309.6; 71/92
[51] Int. Cl.$^2$ ........................................ C07D 233/88
[58] Field of Search ................................ 260/309.6

[56] References Cited
UNITED STATES PATENTS 3,804,833  4/1974  Stahle et al. ......................... 260/253

*Primary Examiner*—Henry R. Jiles
*Assistant Examiner*—C. M. S. Jaisle
*Attorney, Agent, or Firm*—Richard H. Shear

[57] ABSTRACT

A class of 2-imino derivatives of substituted imidazoles are prepared and are useful to regulate the natural growth or development of plants. Representative of this class of imidazoles is 1-isopropyl-2-((3-methoxypropyl)imino)-3-(3,4-dichlorophenyl)-4-methyl-4-imidazoline oxalate.

10 Claims, No Drawings

2-IMINO DERIVATIVES OF SUBSTITUTED IMIDAZOLES

This invention relates to a novel class of imidazole derivatives and to useful compositions comprising said derivatives. Also this invention relates to a method for regulating the natural growth or development of plants using the imidazole derivatives.

The compounds of this invention are 2-imino derivatives of imidazoles and the strong acid salts thereof represented by the formula (1)
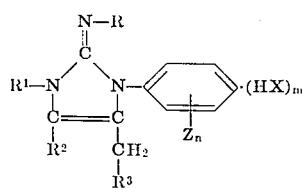

wherein:
- R is lower alkyl or, and preferably, lower alkoxy lower alkyl;
- $R^1$ is lower alkyl;
- $R^2$ is lower alkyl or, and preferably, hydrogen;
- $R^3$ is lower alkyl or, and preferably, hydrogen;
- Z is fluoro, chloro, bromo, lower alkyl, halo lower alkyl, or lower alkoxy;
- n is an integer zero through 2;
- m is zero or 1; and
- X is the anionic moiety of a strong acid.

As employed herein, the term "lower" designates those aliphatic radicals of not more than 4 carbon atoms in straight or branched chain. Representative lower alkyl substituents are methyl, ethyl, propyl, isopropyl, butyl, tert. butyl and the like. Where the substituent is alkoxy, it can be methoxy, ethoxy, propoxy, isopropoxy, butoxy, sec. butoxy and the like. When n is 2 the substituents represented by Z can be like or unlike.

The acid salts of the compounds of formula (1) are derived from inorganic and organic acids having a dissociation constant equal to or greater than about $5 \times 10^{-2}$ and are, for example, the hydrochloride, hydrobromide, hydroiodide, hydrosulfate, perchlorate, dichloroacetate, trichloroacetate, oxalate, maleate, picrate and the like. Preferred salts are the hydrohalides, such as the hydrochloride, and the oxalate.

A novel method for preparing the imidazole derivatives of this invention comprises the reaction of a suitably substituted carbodiimide with a substituted alkynyl amine as illustrated generally by the following

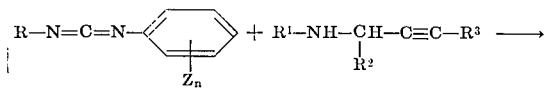

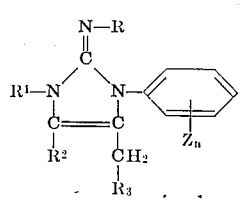

where R, $R^1$, $R^2$, $R^3$, Z and n are previously defined for formula (1).

The acid salts of these imidazole derivatives are conveniently prepared by the addition of the strong acid to the product of the above reaction in a suitable solvent such as acetone, diethyl ether and the like. The acid salts are preferred since they aid in the clean up and isolation of the compounds and exhibit good stability and plant growth regulating activity.

The above reaction of the carbodiimide and the alkynyl amine is usually carried out in the presence of a suitable solvent such as benzene, toluene, xylene and the like. The temperature of the reaction can vary considerably; however, good results are obtained at elevated temperatures and the reaction is preferably run under reflux conditions. The reaction can be run at reduced or elevated pressures and, usually, adequate results are obtained at normal atmospheric pressure. The ratio of the reactants does not appear to be critical and for convenience a slight excess of the alkynyl amine can be used. Of course, the time of the reaction varies according to the conditions employed, however, adequate yields are obtained usually in a matter of hours, for example, from about 1 to 24 hours or longer.

The above described novel method of preparing the imidazole derivatives of formula (1 is the subject of a separate sole application of William D. Dixon filed concurrently herewith and entitled "Preparation of Imidazole Derivatives," Ser. No. 329,788, dated Feb. 5, 1973.

The preparation of the required carbodiimides and the alkynyl amines is well known in the art. The carbodiimides can be readily prepared by the reaction of yellow mercuric oxide with a suitably substituted thiourea as follows:

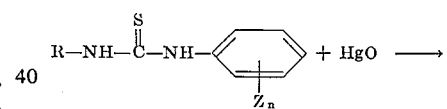

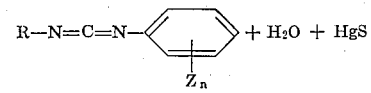

where R, Z and n are as previously defined for formula (1). The preparation of the carbodiimides is shown in greater detail by H. G. Khorana, Chem. Reviews, Vol. 53 (1953) pp. 145–164 and the references cited therein.

The following examples are presented to further illustrate this invention. Parts and percentages are by weight unless otherwise indicated.

EXAMPLE I

1-Isopropyl-2-((3-methoxypropyl)imino)-3-(3,4-dichlorophenyl)-4-methyl-4-imidazoline oxalate.

In a suitable reaction vessel equipped with a thermometer, stirrer and Dean-Stark trap with condenser is placed 14.7 g (0.05 mole) of 1-(3,4-dichlorophenyl)-3-(3-methoxypropyl)-2-thiourea and 100 ml of benzene. The solution is heated to reflux and 16.2 g (0.075 mole) of yellow mercuric oxide is added in small portions. After this addition the reaction is held at reflux for 30 minutes at which time a total of 0.9 ml of water is collected in the Dean-Stark trap. The reaction medium is cooled and filtered. The filtrate is placed in a flask equipped with reflux condenser and 4.9 g (0.05 mole) of N-isopropyl-2-propynylamine is added and heated at reflux for 18 hours, then cooled and the solvent is removed in vacuo. The residue is dissolved in 10 ml of acetone and added to a solution of 6.3 g (0.05 mole) oxalic acid dihydrate in 40 ml of acetone in a suitable vessel and is diluted with 150 ml of ethyl acetate and cooled to yield 7.9 g of solid. The mother liquor is evaporated and the residue is treated with 10 ml of acetone which upon standing yields a solid which upon recrystallization from 15 ml of acetone and 30 ml of ethyl acetate yields an additional 4.3 g of solid for a total yield of 12.2 g (55%) of 1-isopropyl-2-((3-methoxypropyl)imino)-3-(3,4-dichlorophenyl)-4-methyl-4-imidazoline oxalate which upon recrystallization with a 2:1 mixture of ethyl acetate - acetone is a white solid having a mp 123–126°. Nuclear magnetic resonance spectrum analysis in $D_2O$ confirms the following structure

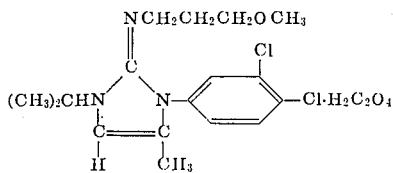

EXAMPLE II

1-Isopropyl-2-n-butylimino-3-(3,4-dichlorophenyl)-4-methyl-4-imidazoline oxalate.

In a suitable vessel equipped with a thermometer, stirrer and Dean Stark trap with condenser is placed 16.2 g of yellow mercuric oxide in 100 ml of benzene. This suspension is heated to reflux with stirring and a solution of 13.8 g (0.05 mole) 1-butyl-3-(3,4-dichlorophenyl)-2-thiourea in 50 ml of benzene is added over a 10 minute period. The reaction medium is held at reflux for 10 minutes, cooled and filtered. The filtrate is placed in suitable vessel, equipped with a stirrer and reflux condenser and 6.0 g (0.06 mole) of N-isopropyl-2-propynylamine is added. The reaction medium is stirred 1 hour at room temperature and 3 hours at reflux conditions. The reaction medium is cooled and the solvent is removed in vacuo. The residue is dissolved in 10 ml of acetone and is added to a solution of 6.3 g oxalic acid dihydrate in 40 ml of acetone. Small amounts of impurities are removed by filtration and the filtrate is diluted with 100 ml of ethyl acetate and cooled overnight to provide a solid product which is recrystallized from acetone to provide 4.7 g product having a mp of 158°–161°C.

Anal. calcd. for $C_{12}H_{25}Cl_2N_3O_4$: C, 53.03; H, 5.86; N, 9.77.

Found: C, 53.16; H, 5.75; N, 9.62.

EXAMPLE III

1-Isopropyl-2-((3-methoxypropyl)imino)-3-phenyl-4-methyl-4-imidazoline oxalate.

In a suitable vessel equipped with stirrer, powder addition funnel and a Dean-Stark trap with a condenser is placed 11.2 g (0.05 mole) of 3-(3-methoxypropyl)-1-phenyl-2-thiourea and 100 ml of benzene. The solution is heated to reflux and yellow mercuric oxide, 16.2 g, is added in small portions. After the addition is complete, the reaction is held at reflux for 10 minutes, cooled and filtered. The filtrate is placed in a vessel equipped with a stirrer and reflux condenser and 6.0 g of isopropyl 2-propynylamine is added. The reaction medium is stirred 1 hour at room temperature and then is heated at reflux for 4 hours. The reaction is cooled and allowed to stand overnight. Solvent was removed in vacuo and residue is taken up in 20 ml of acetone and is added to a solution of 6.3 g oxalic acid dihydrate in 40 ml of acetone. The solution is filtered and the filtrate is diluted with 150 ml of ethyl acetate. Upon cooling, the solvent is removed in vacuo and the residue is placed under 100 ml of ethyl acetate. Upon standing several hours, a gummy solid is formed which is removed by filtration and is recrystallized three times from acetone to give 4.9 g of product having a mp 120°–121°C.

Anal. calcd. for $C_{19}H_{27}N_3O_5$: C, 60.46; H, 7.21; N, 11.13.

Found: C, 60.54; H, 7.22; N, 11.02.

EXAMPLE IV

1-Propyl-2-((3-methoxypropyl)imino)-3-(3,4-dichlorophenyl)-4-methyl-4-imidazoline oxalate.

In a vessel equipped with a thermometer, stirrer and Dean-Stark trap with condenser is placed 14.7 g (0.05 mole) of 1-(3,4-dichlorophenyl)-3-(3-methoxypropyl)-2-thiourea and 100 ml of benzene. The solution is heated to reflux and 16.2 g of yellow mercuric oxide is added in small portions. After the addition the reaction is held at reflux for 20 minutes, cooled and filtered. The filtrate is placed in a vessel equipped with stirrer and reflux condenser and 4.9 (0.05 mole) of N-propyl2-propynylamine is added. The reaction medium is stirred 1 hour at room temperature and 3 hours at reflux. The solvent is removed in vacuo, the residue is dissolved in 10 ml of acetone and then added to a solution of 6.3 g oxalic acid dihydrate in 40 ml of acetone. The solution is then diluted with 150 ml of ethyl acetate and cooled overnight to give 9.6 g solid, mp 115°–120°C. The filtrate is evaporated and the residue is treated with 10 ml of acetone to give 1.5 g of solid, mp 111–118°C. The two portions, 11.8 g, are combined and recrystallized twice from 50 ml of acetone to yield the product having a mp 116°–119°C.

Anal. calcd. for $C_{19}H_{25}Cl_2NCO_5$: C, 51.15; H, 5.65; N, 9.42.

Found: C, 51.28; H, 5.56; N, 9.28.

EXAMPLE V

1Butyl-2-((3-methoxypropyl)imino)-3-(3,4-dichlorophenyl)-4-methyl-4-imidazoline oxalate.

In a vessel equipped with a thermometer, stirrer and Dean-Stark trap with condenser is placed 14.7 g (0.05 mole) of 1-(3,4-dichlorophenyl)-3-(3-methoxypropyl)-2-thiourea and 100 ml of benzene. The solution is heated to reflux and 16.2 g of yellow mercuric oxide is added in small portions. After the addition the reaction is held at reflux for 20 minutes, cooled and filtered. The filtrate is placed in a vessel equipped with a stirrer and reflux condenser and 5.5 g of N-butyl-2-propynylamine is added. The reaction medium is stirred at room temperature for 1 hour and refluxed for 3 hours, cooled and solvent is removed in vacuo. The residue is dissolved in 10 ml of acetone and is added to a solution of 6.3 g oxalic acid dihydrate in 40 ml of acetone. The solution is filtered and the filtrate is diluted with 125 ml of ethyl acetate and cooled to give 10.1 g of solid, mp 115°–119°C. The product is recrystallized from 90 ml of acetone, mp 118°–122°C.

Anal. calcd. for $C_{20}H_{27}Cl_2N_3O_5$: C, 52.18; H, 5.91; N, 9.13.

Found: C, 52.47; H, 6.14; N, 9.09.

EXAMPLE VI

1-Methyl-2-((3-methoxypropyl)imino)-3-(3,4-dichlorophenyl)-4-methyl-4-imidazoline oxalate.

In a vessel equipped with a thermometer, stirrer and Dean-Stark trap with condenser is placed 14.7 g (0.05 mole) of 1-(3,4-dichlorophenyl)-3-(3-methoxypropyl)-2-thiourea and 100 ml of benzene. The solution is heated to reflux and 16.2 g of yellow mercuric oxide is added in small portions. After the addition the reaction is heated at reflux for 20 minutes, cooled and filtered. The filtrate is placed in a vessel equipped with a reflux condenser and 3.5 g (0.05 mole) of N-methyl-2-propynylamine added. The reaction is heated at reflux for 5 hours, cooled and the solvent is removed in vacuo. The residue is dissolved in 10 ml of acetone and is added to a solution of 6.2 g oxalic acid dihydrate in 40 ml of acetone. The solution is diluted with 100 ml of ethyl acetate and cooled overnight to give 13 g solid which is recrystallized from isopropanol to yield the solid product having a mp of 154°–157°C.

Anal. calcd. for $C_{17}H_{21}Cl_2N_3O_5$: C, 48.81; H, 5.06; N, 10.05.

C, 49.25; H, 5.32; N, 9.88.

EXAMPLE VII

1-Methyl-2-((3-methoxypropyl)imino)-3-phenyl-4-methyl-4-imidazoline oxalate.

In a vessel equipped with a thermometer, stirrer and Dean-Stark trap with condenser is placed 11.2 (0.05 mole) of 1-(3-methoxypropyl)-3-phenyl-2-thiourea and 100 ml of benzene. The solution is heated to reflux and 16.2 g of yellow mercuric oxide is added in small portions. After the addition the reaction medium is held at reflux for 20 minutes, cooled and filtered. The filtrate is placed in a vessel equipped with a reflux condenser and 3.5 g (0.05 mole) of N-methyl-2-propynylamine is added. The solution is heated at reflux for 12 hours, cooled and solvent is removed in vacuo. The residue is dissolved in 10 ml of acetone and is added to a solution of 6.3 g oxalic acid dihydrate in 40 ml of acetone. The solution is diluted with 50 ml of ethyl acetate and cooled. A gummy solid is obtained which is recrystallized from isopropanol to yield 6.1 g of the product having a mp of 131°–133°C.

Anal. calcd. for $C_{17}H_{23}N_3O_5$: C, 58.44; H, 6.64; N, 12.03.

Found: C, 58.33; H, 6.49; N, 11.92.

EXAMPLE VIII

1-Isopropyl-2-((3-methoxypropyl)imino)-3-(3-trifluoromethylphenyl)-4-methyl-4-imidazoline oxalate.

In a vessel equipped with a stirrer, thermometer and Dean-Stark trap with condenser is placed 14.6 g (0.05 mole) of 1-(3-methoxypropyl)-3-(3-trifluoromethylphenyl)-2-thiourea and 100 ml of benzene. The solution is heated to reflux and yellow mercuric oxide, 16.2 g, is added in small portions. After the addition the reaction medium is held at reflux for 20 minutes and 0.8 ml of water is collected in the Dean-Stark trap. The reaction is cooled and filtered. The filtrate is placed in a vessel equipped with a reflux condenser and 4.9 g of isopropyl-2-propynylamine is added. The reaction medium is heated at reflux for 12 hours and then solvent is removed in vacuo. The residue is dissolved in 10 ml of acetone and is added to 6.3 g oxalic acid dihydrate in 40 ml acetone, 150 ml of ethyl acetate is added, and the solution is cooled overnight. No precipitate is obtained. The solvent is removed in vacuo and residue is taken up in 70 ml of ethyl acetate and cooled to −35°C. An oil precipitates which solidifies upon scratching. The product is recrystallized twice from ethyl acetate to yield 7.6 g of solid having a mp of 95°–99°C.

Anal. calcd. for $C_{20}H_{26}F_3N_3O_5$: C, 53.92; N, 5.88; N, 9.43.

Found: C, 54.07; H, 5.98; N, 9.52.

EXAMPLE IX

1-Methyl-2-((3-methoxypropyl)imino)-3-(3-fluorophenyl)-4-methyl-4-imidazoline oxalate.

In a vessel equipped with a thermometer, stirrer and Dean-Stark trap with condenser is placed a solution of 1-(3-methoxypropyl)-3-(3-fluorophenyl)-2-thiourea 9.8 g (0.04 mole) in 100 benzene which is heated to reflux and 12.2 g of yellow mercuric oxide is added in small portions. After the addition the reaction medium is held at reflux for 20 minutes and 0.8 ml of water is collected in the Dean-Stark trap. The reaction is cooled and filtered and the filtrate is placed in a vessel equipped with a thermometer and 2.8 g (0.04 mole) of N-methyl-2-propynylamine is added. The reaction is heated at 75°C for 5 hours, cooled and the solvent is removed in vacuo. The residue is taken up in 10 ml of acetone and is added to a solution of 5.0 g oxalic acid dihydrate in 35 ml acetone. Ethyl acetate, 80 ml, is added and the solution cooled at −35°C overnight. An oil is obtained which, upon scratching, produces a solid which is recrystallized from acetone to yield 3.5 g of product having a mp of 143°–145°C.

Anal. calcd. for $C_{17}H_{22}FN_3O_5$: C, 55.57; H, 6.03; N, 11.43.

Found: C, 55.61; H, 5.93; N, 11.17.

EXAMPLE X

1-Methyl-2-((2-ethoxyethyl)imino)-3-phenyl-4-methyl-4-imidazoline oxalate.

In a vessel equipped with a thermometer, stirrer and Dean-Stark trap with condenser is placed 11.2 g (0.05 mole) of 1-(2-ethoxyethyl)-3-phenyl-2-thiourea and 100 ml of benzene. The solution is heated to reflux and 16.2 g of yellow mercuric oxide is added in small portions. After the addition is complete, the reaction medium is held at reflux for 10 minutes, cooled and filtered. The filtrate is placed in a vessel equipped with a stirrer and reflux condenser and 3.5 g (0.05 mole) of N-methyl-2-propynylamine is added. The reaction medium is stirred 1 hour at room temperature and is heated at reflux for 4 hours. The solvent is removed in vacuo and the residue is taken up in 20 ml of acetone and is added to a solution of 6.3 g oxalic acid dihydrate in 40 ml of acetone. The solution is filtered and the filtrate is diluted with 150 ml of ethyl acetate. Upon cooling an oil is obtained. This oil is taken up up in a mixture of acetone/ethyl acetate and precipitated by cooling. This procedure is repeated three times. The oil then is dissolved in acetone and upon prolonged cooling a solid is obtained which is recrystallized from acetone to yield 2.9 g of product having a mp of 113°–114.5°C.
Anal. calcd. for $C_{17}H_{23}N_3O_2$: C, 58.44; H, 6.63; N, 12.03.
Found: C, 58.53; H, 6.64; N, 12.02.

EXAMPLE XI

1-Methyl-2-((3-isopropoxypropyl)imino)-3-phenyl-4-methyl-4-imidazoline oxalate.

In a vessel equipped with a stirrer, thermometer and Dean-Stark trap with condenser is placed 12.1 g (0.05 mole) of 1-(3-isopropoxypropyl)-3-phenyl-2-thiourea and 100 ml of benzene. The solution is heated to reflux and 16.2 g of yellow mercuric oxide is added in small portions. After the addition is complete, the reaction medium is held at reflux for 10 minutes, cooled and filtered. The filtrate is placed in a vessel equipped with a stirrer and reflux condenser and 3.5 g (0.05 mole) of N-methyl-2-propynylamine is added. The reaction medium is stirred for 1 hour and then is heated at reflux for 3 days. The solvent is removed in vacuo and the residue is taken up in a minimum of acetone and is added to a solution of 6.3 g oxalic acid dihydrate in 40 ml of acetone. Ethyl acetate, 150 ml, is added and upon cooling yields 7.1 g of product which upon recrystallization from isopropanol has a mp of 133°–135°C.
Anal. calcd. for $C_{19}H_{37}N_3O_5$: C, 60.45; H, 7.21; N, 11.13.
Found: C, 60.31; H, 7.25; N, 10.89.

EXAMPLE XII

1-Isopropyl-2-((3-methoxypropyl)imino)-3-(3-trifluoromethyl-4-chlorophenyl)-4-methyl-4-imidazoline oxalate.

In a vessel equipped with a stirrer, thermometer and Dean-Stark trap with condenser is placed 16.7 g (0.05 mole) of 1-(3-methoxypropyl)-3-(3-trifluoromethyl-4-chlorophenyl)-2-thiourea and 100 ml of benzene. The solution is heated to reflux and 16.2 g of yellow mercuric oxide is added in small portions. After the addition is complete, the reaction medium is refluxed for 10 minutes, cooled and filtered. The filtrate is placed in a vessel equipped with a reflux condenser and 4.9 g (0.05 mole) of N-isopropyl-2-propynylamine is added. The reaction mixture is heated at reflux for 24 hours, cooled and solvent is removed in vacuo. The residue is taken up in 20 ml of acetone and is added to a solution of 6.3 g oxalic acid in 40 ml of acetone. Ethyl acetate, 150 ml, is added and upon cooling a solid is obtained which is recrystallized from isopropanol to yield 7.5 g of product having a mp of 102°–105°C.
Anal. calcd. for $C_{18}H_{25}ClF_3N_3O_5$: C, 50.05; H, 5.25; N, 8.76.
Found: C, 50.69; H, 4.87; N, 8.41.

The compounds of this invention can also be prepared from the reaction of suitably substituted imidazolium chloride with a substituted amine in accordance with the following general scheme:

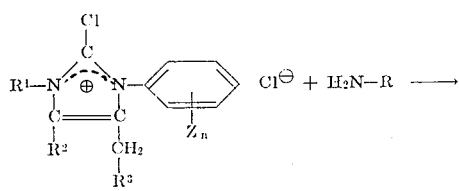

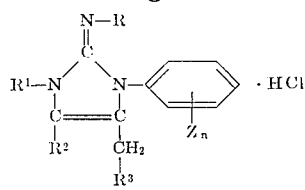

where R, $R^1$, $R^2$, $R^3$, Z and n are as previously defined for formula (1). For convenience, twice the mole amount of the amine is used to take up one mole amount of by-product HCl. Other acid scavengers can be used.

The preparation of the substituted imidazolium chlorides and the mono-substituted amines is known in the art. The substituted imidazolium chlorides can be readily prepared by reacting a substituted alkynyl urea with phosphorous pentachloride which is illustrated as follows:

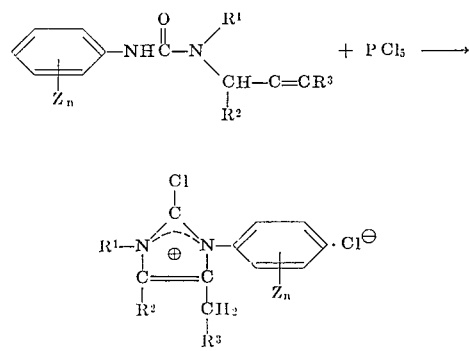

where $R^1$, $R^2$, $R^3$, Z and n are as previously defined. Further details of the preparation of these imidazolium chlorides are found in U.S. Pat. No. 3,136,776 to Paul J. Stoffel issued June 9, 1964 and in the following examples.

EXAMPLE XIII

1-Isopropyl-2-((3-methoxypropyl)imino)-3-(3,4-dichlorophenyl)-4-methyl-4-imidazoline hydrochloride.

A solution of 1-(3,4-dichlorophenyl)-3-isopropyl-3-(2-propynyl) urea, 22.3 g (0.08 mole) and phosphorus pentachloride, 17 g (0.08 mole) in 50 ml of benzene is heated at reflux for 2 hours in a suitable reaction vessel. The reaction medium is cooled and the solid is removed by filtration and washed with 2 × 50 ml portions of ether to give 22 g of the imidazolium chloride. A portion of this imidazolium chloride, 11.1 g (0.03 mole) is placed in a vessel containing 75 ml of chloroform and 0.06 mole of 3-methoxypropyl amine in 50 ml of chloroform is added dropwise. After the addition the reaction medium is heated at reflux for 2 hours, cooled and the solvent is removed in vacuo. The residue solidifies upon standing and is dissolved in a minimum of hot acetonitrile. Upon cooling and scratching a solid is obtained which is recrystallized twice from acetonitrile to give 2.0 g of product having a mp of 220°–223°C.

Anal. calcd. for $C_{17}H_{24}Cl_3N_3O$: C, 51.99; H, 6.16; N, 10.70.
Found: C, 52.20; H, 6.47; N, 10.63.

EXAMPLE XIV

1-Isopropyl-2-((3-methoxypropyl)imino)-3-(4-chlorophenyl)-4-methyl-4-imidazoline hydrochloride.

In a suitable vessel equipped with a reflux condenser a solution of 1-(4-chlorophenyl)-3-isopropyl-3-(2-propynyl) urea, 15.2 g (0.06 mole) in 100 ml of benzene and 0.06 mole of phosphorus pentachloride is heated at reflux for 4 hours, cooled and filtered. The solid is washed with 2 × 100 ml portions of ether and dried to give 13.5 (0.045 mole) of the imidazolium chloride. This material is dissolved in 200 ml of methylene chloride and treated with 8.0 g (0.09 mole) of 3-methoxypropyl amine in 50 ml of methylene chloride. The reaction is exothermic and is held at reflux for 5 hours, cooled and the solvent is then removed in vacuo. The residue is placed in a vessel containing 50 ml of acetone and cooled overnight to give 8.6 g of solid. The filtrate is evaporated and the residue is taken up in 50 ml of ethyl acetate and 10 ml of isopropanol and cooled in dry ice to give a solid which is identified as 3-methoxypropyl aminne hydrochloride. The filtrate is evaporated and the residue is treated with 20 ml of acetone to give an additional 2.1 g of product. The two portions, 10.7 g, are combined and recrystallized from acetone-/ethyl acetate to provide the product having a mp 193°–196°C.

Anal. calcd. for $C_{17}H_{25}Cl_2N_3O$: C, 56.98; H, 7.03; N, 11.73.
Found: C, 56.96; H, 7.05; N, 11.74.

EXAMPLE XV

1-Methyl-2-methylimino-3-(3,4-dichlorophenyl)-4,5-dimethyl-4-imidazoline hydrochloride.

This compound is prepared employing the procedure of Example XIV but replacing the urea with 1-(3,4-dichlorophenyl)-3-methyl-3-(1-methyl-2-propynyl) urea to form the imidazolium chloride and replacing the amine with methyl amine to yield the compound having a mp of 156°–160°C.

EXAMPLE XVI

1-Isopropyl-2-methylimino-3-(3,4-dichlorophenyl)-4-methyl-4-imidazoline hydrochloride.

This compound is prepared employing the procedure of Example XIII but replacing the amine with methyl amine to obtain the compound having a mp of 238°–241°C.

The acid salts of the imidazole derivatives of this invention such as the hydrohalides, the hydrosulfate, the perchlorate, the di- and trichloroacetate, the maleate and the picrate are prepared by employing the procedures of Examples I through XII but replacing the oxalic acid with the appropriate acid. An alternative method for preparing the various acid salts of this invention is by the neutralization of the hydrochloride with sodium hydroxide and subsequently treating the free base with a equimolecular amount of the appropriate acid. Details of this alternative method are set forth in the following example.

EXAMPLE XVII

1-Isopropyl-2-((3-methoxypropyl)imino)-3-(4-chlorophenyl)-4-methyl-4-imidazoline oxalate.

In a suitable vessel, a solution of 2.3 g (0.0064 mole) of 1-isopropyl-2-((3-methoxypropyl)imino)-3-(4-chlorophenyl)-4-methyl-4-imidazoline hydrochloride (Example XIV) in 5 ml of water is cooled to 5°C and a cold solution of 0.26 g sodium hydroxide in 5 ml of water is added and a syrup separates. The mixture is extracted with methylene chloride and the extract is dried over magnesium sulfate. The solvent is removed in vacuo and the residue, 1.86 g, is taken up in a minimum of acetone and is added to a solution of 0.66 g oxalic acid dihydrate in 4.5 ml of acetone. Ethyl acetate, 18 ml, is added and the solution is cooled. After six days 1.52 g of product is obtained having a mp 102°–105°C.
Anal. calcd. for $C_{19}H_{26}ClN_3O_5$: C, 55.40; H, 6.36; N, 10.20.
Found: C, 55.47; H, 6.33; N, 10.36.

The free bases of this invention generally are viscous liquids. The acid addition salts are generally white crystalline solids soluble in most polar solvents, including water.

Utilizing the procedures of the foregoing examples the following illustrative compounds of this invention are prepared:

1-Propyl-2-(  (3-methoxypropyl)imino)-3-phenyl-4-methyl-4-imidazoline oxalate
1-Isopropyl-2-((2-isopropoxyethyl)imino)-3-(3,4-dibromophenyl)-4-methyl-4-imidazoline hydrochloride
1-Isopropyl-2-((3-methoxypropyl)imino)-3-(3-ethoxyphenyl)-4-methyl-4-imidazoline oxalate.
1-Isopropyl-2-((3-methoxypropyl)imino)-3-(3,5-dimethoxyphenyl)-4-methyl-4-imidazoline oxalate
1-Methyl-2-((3-isopropoxypropyl)imino)-3-(3-trifluoromethylphenyl)-4-methyl-4-imidazoline hydroidide
1-Butyl-2-(  (3-methoxypropyl)imino)-3-(3,4-diethylphenyl)-4-methyl-4-imidazoline hydrobromide
1-Isopropyl-2-(  (3-methoxypropyl)imino)-3-(3,4-dichlorophenyl)-4-butyl-4-imidazoline oxalate
1-Isopropyl-2-((2-butoxyethyl)imino)-3-(3-fluoro-4-methylphenyl)-4-methyl-4-imidazoline oxalate
1-Propyl-2-(methoxymethylimino-3-(3-butoxyphenyl)-4,5-dimethyl-4-imidazoline oxalate
1-Isopropyl-2-(  (3-methoxypropyl)imino)-3-(3,4-dichlorophenyl)-4,5-dibutyl-4-imidazoline oxalate
1-Methyl-2-(  (3-isopropoxypropyl)imino)-3-(3-bromo-4-methoxyphenyl)-4-methyl-4-imidazoline hydrochloride
1-Butyl-2-(  (3-methoxypropyl)imino)-3-(3,4-dichlorophenyl)-4-methyl -4-imidazoline hydroiodide
1-Isopropyl-2-propylimino-3-(3,4-dichlorophenyl)-4-methyl-4-imidazoline oxalate
1-Ethyl-2-((3-methoxypropyl)imino)-3-(3-trifluoromethylphenyl)-4-methyl-4-imidazoline oxalate
1-Isopropyl-2-(  (3-butoxypropyl)imino)-3-(3,4-dichlorophenyl)-4-methyl-4-imidazoline oxalate.

The compounds of this invention, as previous defined by formula (1), are effective plant regulators. It is to be understood that the term "plant regulator" is used herein in its common usage and means a substance which, through physiological action, will accelerate or retard the rate of growth or rate of maturation or otherwise alter the behavior of ornamental or crop plants or the product thereof. Thus, the usage herein conforms to the definitions provided by Congress in Public Law 92–516, the Federal Environmental Pesticide Control Act of 1972, section 2, subsection v, wherein the term plant regulator is defined as any substance or mixture of substances intended, through physiological action, for accelerating or retarding the rate of growth or rate of maturation, or for otherwise altering the behavior of plants or the produce thereof, but shall not include substances to the extent that they are intended as plant nutrients, trace elements, nutritional chemicals, plant inoculants, and soil amendments.

The method of regulating the natural growth or development of plants provided by this invention comprises applying to the plant an effective plant-regulating amount of a compound of the formula

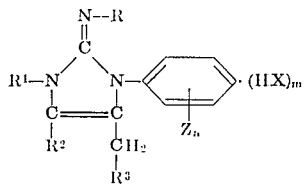

where R, $R^1$, $R^2$, $R^3$, Z, n, m and X are as previously defined for formula (1).

Thus, in accordance with this invention a method is provided whereby viable plants are treated with a chemical substance which alters their natural growth or development to enhance various agricultural or horticultural features of the plants. As employed herein, the term "natural growth or development" designates the normal life cycle of the plant in accordance with its genetics and its environment, in the absence of artificial, external influences.

The term "active ingredient" will be used hereinafter in this specification to connote one or more of the compounds of formula (1).

It is to be understood that the regulation of natural growth and development does not include killing or herbicidal action. Although phytotoxic or lethal amounts of the active ingredient might be employed to destroy certain plants, it is contemplated here to employ only such amounts of said active ingredient as will serve to regulate the natural growth and development of useful plants without substantial injury. As may be expected, and as long understood by those skilled in the art, such effective plant regulating amounts will vary, not only with the particular active ingredient selected for treatment, but also with the regulatory effect to be achieved, the species of plant being treated and its stage of development, and whether a permanent or transient regulating effect is sought. Other factors which may bear upon the determination of an appropriate plant regulating amount include the plant growth medium, the manner in which the treatment is to be applied, weather conditions such as temperature or rainfall, and the like.

In accordance with the instant invention it has been found that desriable regulation of natural plant growth or development is achieved by application of the active ingredient to plants in various stages of development. Accordingiy, in the practice of this invention the active ingredient can be applied to the plant in the seedling stage, flowering stage or fruiting stage and the like or can be applied to plants at more than one stage of development. Such application may be made directly to one or more of the plant's parts, such as, stems, leaves, flowers, fruit or the like and, generally, application is made applying the active ingredient to the foliage of the plant.

Regulation of the natural growth or development of plants by chemical treatment results from the effect of the chemical substance on the physiological processes of the plant and the effect of such substance may be manifested by the morphology of the plant. As should by readily apparent, said regulation may also result from a combined or sequential effect of the chemical manifesting a response in both physiology and morphology.

In general, regulation of the natural growth or development which leads to a morphological change in the plant is readily noticeable by visual observation. Such changes can be found in the size, shape, color or texture of the treated plant or any of its parts. Similarly, changes in the quantity of plant fruit or flowers can be simply noted.

On the other hand, regulation which leads to changes only in the physiological processes occur within the treated plant and are usually hidden from the eye of an observer. Changes of this type are most often in the production, location, storage or use of naturally occurring chemicals, including hormones, within the plant. Physiological changes in a plant often are recognized when followed by a subsequent change in morphology. Additionally, there are numerous analytical procedures known to those skilled in the art for determining the nature and magnitude of changes in the various physiological processes.

The individual compounds of the instant invention serve to regulate the natural growth or development of treated plants in a number of diverse ways and it is to be understood that each compound may not produce identical regulatory effects on each plant species or at every rate of application. As stated above, responses will vary in accordance with the compound, the rate, the plant, etc.

A regulatory response demonstrated by the compounds useful in the practice of this invention can be generally termed retardation of vegetative growth and such a response has a wide variety of beneficial features. In certain plants this retardation of vegetative growth causes a diminution or elimination of apical dominance leading to a shorter main stem and increased lateral branching. This regulation of the natural growth or development of plants produces smaller, bushier plants which often demonstrate increased resistance to climatic extremes, pest infestations and the like. Thus, the method of this invention provides for plants that are in a good state of health and tends to produce more effective plants.

As illustrated in the examples hereinafter presented, the individual compounds of this invention regulate the natural growth or development of treated dicotyledonous plants in numerous other and different respects. Included among these other regulatory effects are the inducing of axillary bud development, the alteration of shape of canopy, the delay or acceleration of fruit or pod set, etc. Although regulatory effects such as those described above can be desirable, often it is the ultimate result of these effects upon the economic factor which is of primary significance in crop plants or upon the aesthetic factor in ornamental plants. Thus, it must be recognized that increases in yield of individual plants, increases in the yield per unit of cropping area, improvement in the quality of the plants' product, improvement in the plants' vigor and reductions in the cost of harvesting and/or subsequent processing are all to be considered in any assessment of the consequence of an individual regulatory effect during the growth or development of a plant.

The practice of the method of this invention is particularly useful for improving the efficiency of dicotyledonous row crops such as soybean (Glycine). The application of the imidazole derivatives of this invention to such growing crop plants reduces the stature of the plants without the expected substantial reduction in seed yield. In this manner the plant's efficiency of production is improved and a means is provided for optimizing the crop by increasing the plant population per unit area and treating said crop with the active ingredient during its growing stage. Such reduction in plant stature also increases accessibility to the field for other treatments, cultivation and harvesting.

In selecting the appropriate nonherbicidal rate of application of the active ingredient, it will be recognized that precise dosages will be dependent upon the plant species being treated, the development stage of the plant, the particular chemical employed, the mode of application and various other factors known to those skilled in the art. In general, the active ingredients are applied to plants in amounts from about 0.05 to about 10 or more sounds per acre. Foliar applications of from 0.1 to 5 pounds of the active ingredient per acre are preferred. Foliar application to plants at the blooming stage, e.g. 10% blossoms, are particularly advantageous.

The useful and unexpected plant growth regulating properties of the imidazole derivatives of the foregoing formula are demonstrated by exemplary tests set forth below as Example XVIII. In the following examples the chemical was applied as an aqueous composition at the equivalent rate of active ingredient indicated. The aqueous compositions were prepared by solubilizing the required amount of the chemical in a volume of acetone or water which is further admixed with a like volume of 0.5% by weight aqueous solution of polysorbitan monolaurate, Tween 20, surface active agent, to provide sufficient composition which is applied at the rate equivalent to 200 gallons per acre to apply the chemical at the equivalent rate indicated.

EXAMPLE XVIII

A number of soybean plants, representative of dicotyledonous plants, are grown from seed in aluminum pans in a greenhouse for a period of approximately one week to the primary leaf stage. The plants are thinned to three uniform plants in each pan and the height of each plant is measured to the terminal bud and the average height is noted. One pan containing three soybean plants is used for each chemical treatment and four pans are not treated and used as a control. The aqueous composition of the chemical is then applied to the pan of growing plants by overhead spray at an established rate expressed as pounds per acre. The treated pans along with the control pans are watered from below, fertilized and otherwise maintained in a greenhouse under uniform growth conditions. Two weeks after application of the chemical the average height of the plants in the treated pan is determined as above and the difference in the average height before and two weeks after application represents the development of the treated plants. This development in growth of the treated plants is compared to the average development in growth of the plants in the control pans during the same period of time. A variation of 25% or more in the development of at least two-thirds of the treated plants when compared to the development of the control plant demonstrates that the chemical is effective for regulating the natural growth or development of the plants. Accordingly, a chemical is considered effective when the treated plants manifest at least a 25% decrease in height development when compared to the untreated control plants, i.e., retardation of vegetative growth.

Using the procedure of Example XVIII, retardation of vegetative growth in excess of 25% was obtained with the imidazole derivatives of this invention at the rate indicated.

| Compound of Example | lbs/acre | Other Observed Modifications |
| --- | --- | --- |
| I | 3.0 | dark foliar color |
|  | 1.8 | dark foliar color |
|  | 0.3 | dark foliar color |
| II | 3.0 | sl. leaf burn. altered canopy |
|  | 1.2 | altered canopy |
| III | 3.0 | dark foliar color |
|  | 1.2 | dark foliar color |
| IV | 3.0 | sl. leaf burn, dark foliar color |
|  | 1.2 | dark foliar color |
| V | 3.0 | sl. leaf burn |
|  | 1.2 |  |
| VI | 3.0 | sl. leaf burn, dark foliar color |
| VII | 3.0 | sl. leaf burn |
|  | 1.2 |  |
| VIII | 3.0 | sl. leaf burn, dark foliar color, altered canopy |
|  | 1.2 | sl. leaf burn, dark foliar color, altered canopy |
|  | 0.6 | dark foliar color, altered canopy |
| IX | 3.0 | sl. leaf burn, altered canopy |
| X | 3.0 | sl. leaf burn, dark foliar color, leaf inhibition |
| XI | 3.0 | sl. leaf burn, dark foliar color, altered canopy |
|  | 1.2 | sl. leaf burn, dark foliar colar, altered canopy |
|  | 0.6 | dark foliar color, altered canopy |
| XII | 3.0 | dark foliar color, altered canopy, axillary bud dev. |
|  | 1.2 | dark foliar color, altered canopy, axillary bud dev. |
| XIII | 3.0 | sl. leaf burn, dark foliar color, axillary bud dev. |
|  | 1.2 | dark foliar color, altered canopy, axillary bud dev. |
| XIV | 3.0 | sl. leaf burn, dark foliar color, altered canopy |
|  | 1.2 | dark foliar color, altered canopy, axillary bud dev. |
| XVII | 3.0 | sl. leaf burn, dark foliar color, altered canopy |

The dark foliar color observed in the foregoing tests results in a darker green plant and demonstrates higher chlorophyll activity which indicates an improved rate of photosynthesis. The slight leaf burn observed in some of the tests is limited to the foliage actually treated and is not observed in the new growth nor does it appear to be detrimental to the plant's development. Although additional tests were run at higher and lower rates of application, the rates recited above are indicative of the type of plant growth regulation obtained with the active ingredients of this invention when applied to plants at an early stage of growth.

EXAMPLE XIX

In this evaluation soybean plants growing in individual pots which were 4 weeks old (3–4 trifoliate stage)

and 6 weeks old (5–6 trifoliate stage) were used for each application of chemical. An overhead spray of an aqueous composition of the chemical is applied to 2 pots at each growth stage at an equivalent rate as indicated below. Two to four sets of plants which receive no chemical application are included and serve as controls. All of the pots are maintained under good growing conditions and are watered and are uniformly fertilized under uniform conditions. Two weeks after the application of the chemical the growth response of the treated plants are compared with that of the control plants. The total height of the plant is measured to the tip of the terminal bud. A decrease of 15% or more in the average total height of the treated plants, when compared to that of the control plants, demonstrates that the chemical is effective for regulating the natural growth or development of the plants. In addition to this retardation of vegetative growth other observations indicating a response in the plants treated with chemicals of this invention were noted.

Employing the procedure of Example XIX, representative compounds of this invention were effective in reducing the total height of the plant in excess of 15% at the equivalent rate of application indicated below to the four week old and 6 week old plants.

| Compound of Example | lbs/acre | Other Observed Modifications |
|---|---|---|
| I | 0.5 | dark foliar color, axillary bud dev. |
| II | 2.5 | dark foliar color |
| III | 1.0 | dark foliar color, delayed pod set |
| IV | 2.5 1.0 | dark foliar color |
| V | 2.5 1.0 | |
| VI | 2.5 | |
| VII | 2.5 | |
| VIII | 1.0 | sl. leaf burn, dark foliar color |
|  | 0.5 | dark foliar color, early pod set, inhibit pod dev. |
| XII | 1.0 0.5 | dark foliar color dark foliar color |
| XIII | 1.0 | dark foliar color |
| XIV | 1.0 | sl. leaf burn, dark foliar color |
|  | 0.5 | dark foliar color, early pod set, inhibited pod dev. |

The compound of Example I was used as the active ingredient in field tests in two separate locations. In both tests Wayne soybeans were grown at excessive populations of approximately 200,000 plants per acre. The compound was applied as an aqueous composition to the plants at early bloom, about 10% bloom, and the treated plants were compared to control plants grown under the same conditions. At one location the chemical was applied at the rate of 1 pound and 2 pounds per acre. At both rates the treated plants when compared to the control plants demonstrated shorter, more compact plants having a darker green color and an improvement in the seed yield. The treatment at the 1 pound per acre rate provided the best yield improvement. At the other location the compound was applied at 0.75, 1.25 and 2.5 pounds per acre which resulted in shorter more compact plants having a darker green color. At the 0.75 pound per acre rate the yield was not affected. At the rate of 1.25 pounds per acre a yield improvement was obtained and at 2.5 pounds per acre the yield was very slightly less than the control plot. Accordingly, the most effective rate of application of the compound of Example I under these cultural practices is approximately 1.0 to 2.0 pounds per acre.

Another embodiment of this invention is a plant growth-regulating composition comprising an adjuvant and an effective plant growth-regulating amount of a compound of formula (1).

The plant growth-regulating compositions are particularly effective for practicing the method of regulating the natural growth or development of plants provided by this invention. In view of the activity of the imidazole derivatives at low rates of application, it is desirable to use compositions comprising an effecctive amount of the active ingredient and an adjuvant to facilitate a uniform distribution of the imidazole derivative on the plants. Adjuvant, as used herein, includes one or more materials in liquid or solid form. Thus, suitable adjuvants are diluents, extenders, carriers, surfactants, foaming agents, conditioning agents, solvents and, usually, combinations thereof. The compositions can be in numerous forms, such as, dusts, powders, wettable powders, solutions, foams, dispersions or emulsions. Generally, it is preferred to use one or more surfactants in the plant growth-regulating compositions which aid in wetting the treated plant surface and for providing stable dispersions of the active ingredient in various inert carriers or diluents in the composition or added to the composition prior to application to the plants. Suitable surfactants which can be employed in the compositions of this invention are known surface active agents, such as, wetting agents, emulsifiers, dispersing agents and can be nonionic, anionic or cationic. Preferred surfactants are the nonionic or the anionic type which are widely used in compositions employed in agronomic treatments. Representative nonionic surfactants are polyoxyethylene esters of fatty acids, octylphenyl polyethylene glycol ethers, polyoxyethylene derivatives of long-chain alcohols and the like. Representative anionic surfactants are alkali and alkaline earth salts or alkylarylsulfonic acids such as sodium lauryl sulfonate, dialkyl sodium sulfosuccinate esters and the like, Usually the plant growth-regulating compositions of this invention take the form of a concentrate which can be readily extended with an inert carrier prior to application to the plants. Said concentrates in liquid form consist of a solvent, surfactant and about 25 to 75% by weight of the imidazole derivative. These liquid concentrates can be diluted with water to provide a composition, suitable for application to plants, which contains from about 0.1 to about 15% by weight of the active ingredient. Concentrates in solid form are wettable powders consisting of finely divided solids such as attapulgite, surfactant and from about 5 to 50% or more by weight of the imidazole derivative which are diluted with water prior to applying to the plants.

In utilizing the methods and compositions of this invention, it is advantageous to treat dicotyledonous crops planted at excessive populations per unit area with an effective amount of the imidazole derivative to elicit a growth response in the plant which compensates for the overcrowding in the field and the usual reduction in yield.

The methods of this invention can be conveniently carried out in conjunction with agronomic practices such as treating the plants with insecticides, fungicides, nematocides, fertilizer and the like. The application of compositions containing an imidazole derivative as herein defined and other agricultural chemicals such as selective herbicides, insecticides, fungicides, fertilizers, nematocides and the like are particularly advantageous for obtaining the desired results with minimum treatment costs.

Although this invention has been described with respect to specific modifications, the details thereof are not to be construed as limitations, for it will be apparent that various equivalents, changes and modifications may be resorted to without departing from the spirit and scope thereof and it is understood that such equivalent embodiments are intended to be included herein.

The embodiments of the invention in which an exclusive property or privilege is claimed are defined as follows:

1. A compound of the formula

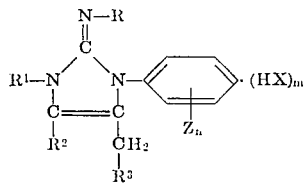

wherein:
R is lower alkyl or lower alkoxy lower alkyl;
$R^1$ is lower alkyl;
$R^2$ is lower alkyl or hydrogen;
$R^3$ is lower alkyl or hydrogen;
Z is fluoro, chloro, bromo, lower alkyl, halo lower alkyl or lower alkoxy;
$n$ is an integer 0 through 2;
$m$ is an integer 0 or 1; and
X is an anionic moiety of a strong acid.

2. The compound of claim 1 wherein $m$ is 1.

3. The compound of claim 2 wherein $R^2$ and $R^3$ are hydrogen.

4. The compound of claim 3 wherein R is 3-methoxypropyl.

5. The compound of claim 4 wherein Z is chloro and $n$ is 2.

6. The compound of claim 1 which is 1-isopropyl-2-((3-methoxypropyl)imino)-3-(3,4-dichlorophenyl)-4-methyl-4-imidazoline.

7. The compound of claim 2 which is 1-methyl-2-methylimino-3-(3,4-dichlorophenyl)-4,5-dimethyl-4-imidazoline hydrochloride.

8. The compound of claim 4 which is 1-isopropyl-2-((3-methoxypropyl)imino)-3-(3,4-dichlorophenyl)-4-methyl-4-imidazoline oxalate.

9. The compound of claim 4 which is 1-propyl-2-((3-methoxypropyl)imino)-3-(3,4-dichlorophenyl)-4-methyl-4-imidazoline oxalate.

10. The compound of claim 4 which is 1-isopropyl-2-((3-methoxypropyl)imino)-3-3-phenyl-4-methyl-4-imidazoline oxalate.

* * * * *